(12) United States Patent
Hofsaess

(10) Patent No.: US 7,543,505 B2
(45) Date of Patent: Jun. 9, 2009

(54) MEASURING INSTRUMENT AND METHOD FOR DETECTING A FORCE

(75) Inventor: Michael Hofsaess, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 1683 days.

(21) Appl. No.: 10/069,452

(22) PCT Filed: Feb. 16, 2001

(86) PCT No.: PCT/DE01/00591

§ 371 (c)(1),
(2), (4) Date: Jun. 11, 2002

(87) PCT Pub. No.: WO01/62564

PCT Pub. Date: Aug. 30, 2001

(65) Prior Publication Data

US 2008/0092669 A1 Apr. 24, 2008

(30) Foreign Application Priority Data

Feb. 26, 2000 (DE) .............................. 100 09 168

(51) Int. Cl.
*G01L 1/00* (2006.01)
(52) U.S. Cl. ........................................................ 73/779
(58) Field of Classification Search .................... 73/779
See application file for complete search history.

(56) References Cited

U.S. PATENT DOCUMENTS

| 2,351,377 | A | * | 6/1944 | Warsher | 335/276 |
| 3,726,369 | A | | 4/1973 | Esteves | |
| 4,338,585 | A | * | 7/1982 | Volke | 335/274 |
| 4,532,810 | A | * | 8/1985 | Prinz et al. | 73/717 |
| 5,326,982 | A | * | 7/1994 | Wiklund | 250/559.19 |
| 5,339,699 | A | | 8/1994 | Carignan | |
| 6,931,940 | B2 | * | 8/2005 | Baudendistel | 73/779 |
| 7,073,391 | B2 | * | 7/2006 | Dukart | 73/779 |

FOREIGN PATENT DOCUMENTS

| DE | 41 03 589 A1 | 8/1992 |
| DE | 43 32 470 A | 3/1995 |
| DE | 197 24 387 A | 12/1998 |
| DE | 198 38 037 A | 2/2000 |
| DE | 198 55 358 A | 6/2000 |

* cited by examiner

*Primary Examiner*—Lisa M Caputo
*Assistant Examiner*—Octavia Davis
(74) *Attorney, Agent, or Firm*—Michael J. Striker

(57) ABSTRACT

The present invention relates to a force measuring instrument, having a carrier plate (3), at least one magnet (5), and at least one magnetically sensitive element (6). A tongue element (4) protrudes at least partly from the carrier plate (3) and is joined to a plate element (2). Between the tongue element (4) and the carrier plate (3), an air gap (7) is formed, in which the magnetically sensitive element (6) is positioned. The force to be measured, delivered via the plate element (2), leads to a relative motion between the end, toward the air gap, of the tongue element (4) and the carrier plate (3). This causes a change in the magnetic field geometry in the air gap (7). The present invention also relates to a method for detecting a force.

8 Claims, 3 Drawing Sheets

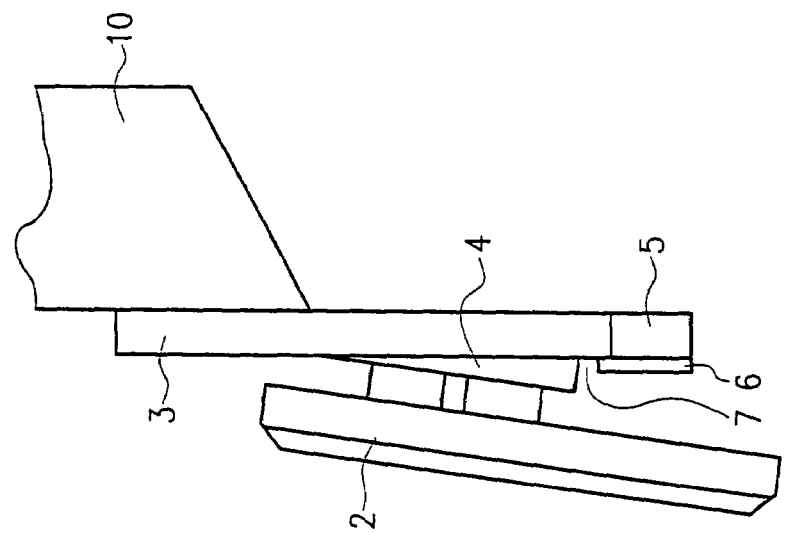
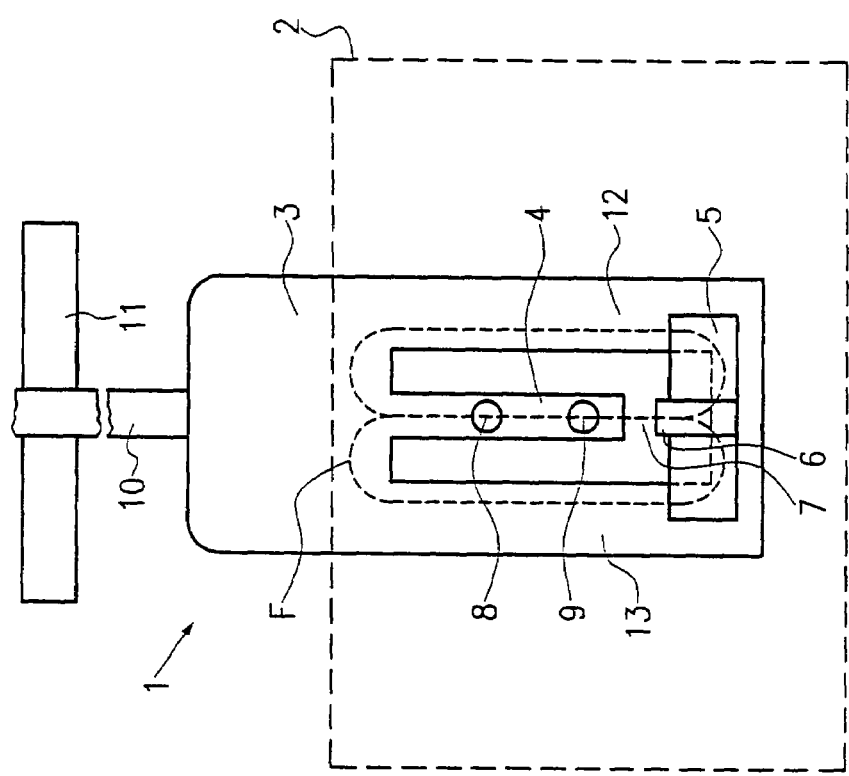
Fig.1
Fig.2

MEASURING INSTRUMENT AND METHOD FOR DETECTING A FORCE

CROSS-REFERENCE

The invention described and claimed hereinbelow is also described in PCT/DE 01/00591, filed on Feb. 16, 2001 and DE 100 09 168.7, filed on Feb. 26, 2000. This German Patent Application, whose subject matter is incorporated here by reference, provides the basis for a claim of priority of invention under 35 U.S.C. 119(a)-(d).

BACKGROUND OF THE INVENTION

The invention relates to a measuring instrument for detecting a force and to a method for detecting a force. In particular, the present invention relates to a measuring instrument and to a method for detecting a pedal force, exerted by a driver, in a vehicle.

Lately, particularly in the automotive field, ever-increasing numbers of electronic systems are being used, such as anti-lock brake systems, traction control systems, or electronic brake systems. Especially for electronic brake systems, it is necessary for the force exerted on the brake pedal by the driver to be detected as precisely as possible, so that in accordance with it, a braking instruction can be provided to the brake devices of the vehicle. Using known travel measuring devices is disadvantageous in the sense that a constant association of the ratio of the travel to the force is not possible. That is, what the driver is asking for cannot be learned on the basis of the travel signal. Moreover, this requires mounting on the foot pedal mechanism of the pedal, which can lead to unfavorable installation geometries in the area of the pedal. For vehicles with right-/left-hand drive and automatic/manual transmissions, a separate sensor must be kept on hand for the various geometries of the pedals involved.

Pressure measuring instruments are also known, which work by way of diaphragm deformation, for instance, or use piezoelectric elements. In the use of pressure measuring instruments for detecting the brake pedal force, however, it is disadvantageous that what the driver is asking for is not immediately obtainable. In addition, the (damping-dependent) dynamics of the pressure measuring instrument are relatively poor, and an output signal with relatively pronounced hysteresis is obtained.

SUMMARY OF THE INVENTION

A measuring instrument according to the invention for detecting a force has the advantage over the prior art that a direct detection of what the driver is asking for is possible. On the basis of the direct detection of what the driver is asking for, it is also possible to use a smaller brake booster. There is also less hysteresis, and simpler regulation of braking delay is possible. Braking onset events, that is, states at the onset of the braking event, can also be detected early. Advantageously, the output signal of a measuring instrument of the invention for detecting a force also has high dynamics. As a result, especially advantageously, the signal can be used in the functions of a braking assist. When a force measuring instrument is used in combination with a travel sensor and pressure sensors, optimal control and monitoring of a wheel brake system of a motor vehicle (driver warning, servicing information notices, diagnostic memory) can advantageously be achieved. Since the measuring instrument of the invention for detecting a force has a tongue element protruding from a carrier plate, and the tongue element can be connected to a pedal plate, for instance, the measuring instrument of the invention can be installed directly on the pedal plate. This makes it possible to avoid the disadvantages of installing a measuring instrument on the foot pedal mechanism of the pedal lever. Moreover, the force measuring instrument of the invention, because it is mounted directly on the brake pedal, can be used in the most various pedal geometries without structural changes.

A measuring instrument according to the invention for detecting a force Has the advantage over the prior art that a direct detection of what the driver is asking for is possible. On the basis of the direct detection of what the driver is asking for, it is also possible to use a smaller brake booster. There is also less hysteresis, and simpler regulation of braking delay is possible. Braking onset events, that is, states at the onset of the braking event, can also be detected early. Advantageously, the output signal of a measuring instrument of the invention for detecting a force also has high dynamics. As a result, especially advantageously, the signal can be used in the functions of a braking assist. When a force measuring instrument is used in combination with a travel sensor and pressure sensors, optimal control and monitoring of a wheel brake system of a motor vehicle (driver warning, servicing information notices, diagnostic memory) can advantageously be achieved. Since the measuring instrument of the invention for detecting a force has a tongue element protruding from a carrier plate, and the tongue element can be connected to a pedal plate, for instance, the measuring instrument of the invention can be installed directly on the pedal plate. This makes it possible to avoid the disadvantages of installing a measuring instrument on the foot pedal mechanism of the pedal lever. Moreover, the force measuring instrument of the invention, because it is mounted directly on the brake pedal, can be used in the most various pedal geometries without structural changes.

By the disposition of a magnet on the tongue element of the force measuring instrument or on the carrier plate of the force measuring instrument, a simple, space-saving design can be achieved.

Preferably, the tongue element is formed integrally with the carrier plate. This can be accomplished for instance by stamping it out from the carrier plate. The force measuring instrument can be produced simply and economically as a result.

To attain an amplification of the measurement effect, the force measuring instrument of the invention has two magnets, which are preferably of opposite polarity. A first magnet, for instance, can be secured to the tongue element, while a second magnet can be secured to the carrier plate. In a disposition in which the two magnets have opposite polarity, a strong field displacement, which assures the strong measurement effect, occurs because of a polarization of the two magnets in the same direction in the air gap between the tongue element and the carrier plate. This furthermore makes it possible for an angle by which the tongue element protrudes from the carrier plate to be made small. This results in a very compact design of the force measuring instrument.

Preferably, a stop is provided to limit the motion of the tongue element. This stop can be embodied on the carrier plate on the pedal plate, for instance. By the use of a stop, a high overload capacity of the force measuring instrument can furthermore be assured.

The tongue element is preferably embodied as a barlike element. As a result, in particular, a small air gap is attainable between the tongue element and the carrier plate. Because of this, the force measuring instrument of the invention can have a high degree of protection against interference. The influence of magnetic interference variables, such as starter actuation, or a lining that contains metal or shoes that contain metal in the vicinity of the pedal, can be ignored. Moreover, the measurement sensitivity and overload capacity of the force measuring instrument can be adjusted by way of a geometric design of the tongue element and of the magnetic flux. As a result, a combination of high sensitivity in the desired measurement range and high overload capacity can be attained.

Especially advantageously, the force measuring instrument of the invention can be combined with other sensors, such as travel or pressure sensors for picking up a braking force exerted. The force measuring instrument is responsible for picking up small forces (50 to 80 Newtons), which must be resolved with very high resolution, to enable outputting signals accordingly to the brake control system. For greater forces, beyond about 300 Newtons, the force measuring instrument can rest on the stop, and the further pickup of the greater forces of the driver's foot can be done by means of the other sensors. Thus, in particular, an exact measurement of the force at the onset of braking and the force in slight braking events can be detected exactly.

A field plate, magnet transistor, coil, magnetoresistive element, or Hall element can be used, for instance, as the magnetically sensitive element of the force measuring instrument. It is important in this respect that the magnetically sensitive element have the most linear possible dependency of an output signal on the magnetic induction. It is then possible to use one magnetically sensitive element, or for safety reasons, to furnish a redundant system, to use two or more magnetically sensitive elements.

The force measuring instrument of the invention can be constructed economically with already known components. Since the requisite installation space is quite small, the force measuring instrument can easily be disposed behind a pedal plate of a motor vehicle, for instance. It can also be used for differently designed pedals and pedal suspensions of different designs. The force measuring instrument can also easily be installed, without modifications to the force measuring instrument, in right-hand or left-hand drive vehicles as well as vehicles with automatic transmissions or manual transmissions. This makes it possible to standardize the force measuring instrument, thus making major advantages possible in terms of production and cost.

According to the invention, a method for detecting a force is also proposed, in which a force, which is delivered via a movable tongue element, is converted into a relative motion between the tongue element and a carrier plate. The relative motion between the tongue element and the carrier plate leads to a change in a magnetic induction in an air gap disposed between them, and this can be detected by means of a magnetically sensitive element disposed in the air gap. This makes a direct detection of the force exerted on the force measuring instrument possible.

BRIEF DESCRIPTION OF THE DRAWINGS

A plurality of exemplary embodiments of the invention are shown in the drawing and are explained in further detail in the ensuing description.

FIG. 1 shows a plan view of a force measuring instrument in a first exemplary embodiment of the present invention;

FIG. 2 shows a side view of the force measuring instrument shown in FIG. 1;

Figure 6:
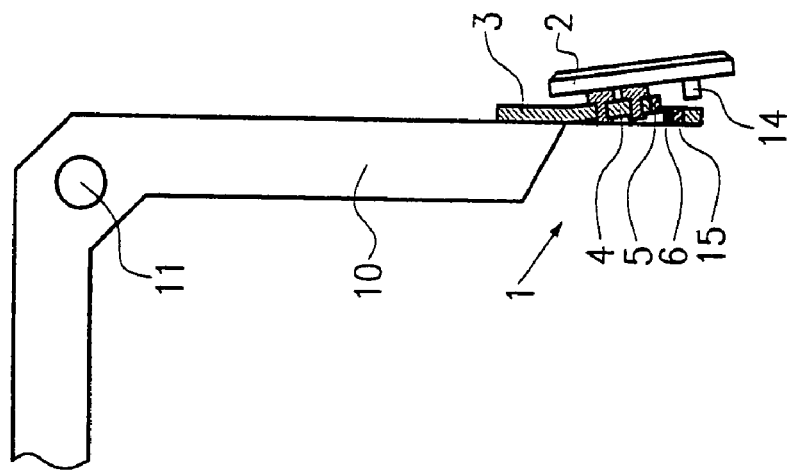
FIG. 6 is a side view of the pedal assembly shown in FIGS. 3-5.
Figure 5:
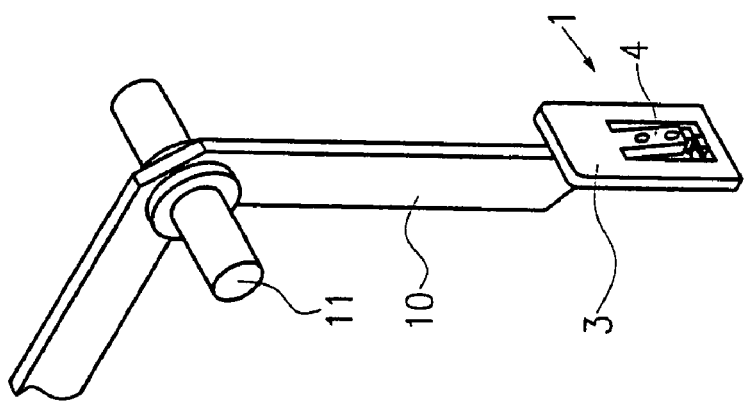
FIG. 5 is a perspective view of the force measuring instrument shown in FIGS. 3 and 4.
Figure 4:
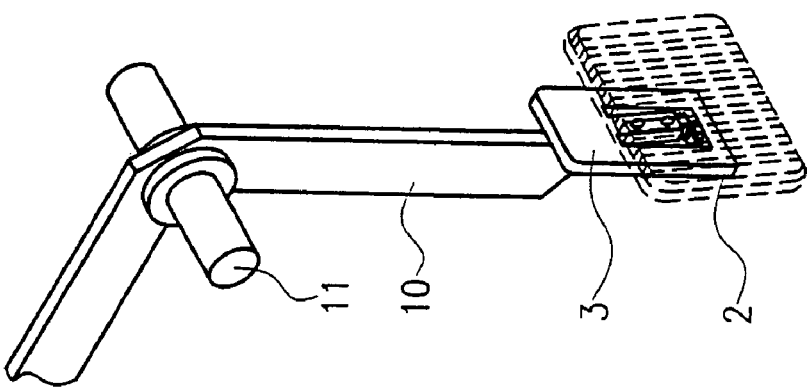
FIG. 4 is a perspective view of the pedal assembly shown in FIG. 3, with the pedal plate shown in dashed lines.
Figure 3:
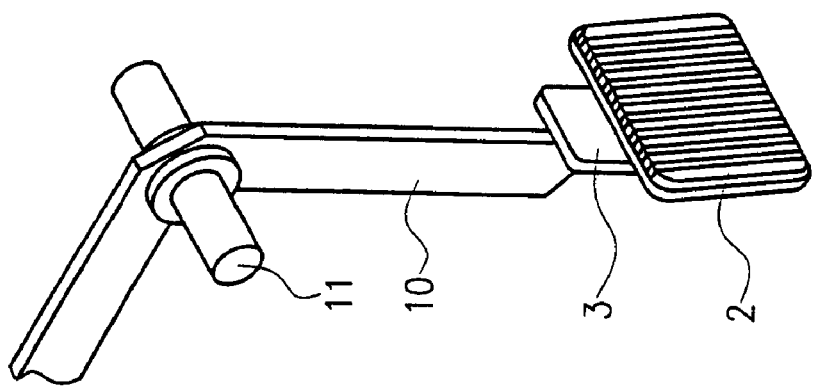
FIG. 3 is a perspective view of a pedal assembly, in which a force measuring instrument in a second exemplary embodiment of the present invention is used.

DETAILED DESCRIPTION OF THE
EXEMPLARY EMBODIMENTS

In FIGS. 1 and 2, a first exemplary embodiment of the force measuring instrument of the invention is shown. This force measuring instrument 1 is used in a pedal assembly of a motor vehicle. As shown in FIG. 1, the force measuring instrument 1 includes a carrier plate 3 and a tongue element 4. The tongue element 4 is formed integrally with the carrier plate 3 and is made for instance by stamping. As shown in FIG. 2, the tongue element 4 protrudes partly from the carrier plate 3. The tongue element 4 is embodied resiliently, so that when the pedal is not actuated, the tongue element returns to its outset position. The tongue element 4 also has two through openings 8 and 9, through which bolts are guided in order to join the tongue element 4 to a pedal plate 2.

As shown in FIG. 1, the tongue element 4 is embodied in barlike fashion, and an air gap 7 is formed between the tongue element 4 and the carrier plate 3. A magnetically sensitive element 6, such as a Hall element or a magnetoresistive element, is disposed in this air gap 7. As shown in FIG. 1, a magnet 5 is also provided, which is disposed on the carrier plate 3 in such a way that the magnetically sensitive element 6 is disposed between the magnet 5 and the tongue element 4.

The carrier plate 3 is also connected to a brake pedal lever 10, which is rotatably supported on a bearing 11. The two side parts of the carrier plate 3 are embodied as stops 12 and 13. The magnetic flux F of the force measuring instrument is also shown in FIG. 1. From the magnet 5, the magnetic flux passes via the magnetically sensitive element 6 and the air gap 7 to reach the tongue element 4, and it is returned to the magnet via the carrier plate 3 and the two lateral stops 12 and 13.

The mode of operation of the force measuring instrument in the first exemplary embodiment will now be described. When a driver initiates a braking event by exerting a pedal force on the pedal plate 2, the tongue element 4 that is solidly joined to the pedal plate 2 is rotated about an axis, not shown, at which the tongue element 4 is joined to the carrier plate 3. In other words, by means of the force exerted, the tongue 4 is pressed in the direction of the carrier plate 3 until it is located in the same plane as the carrier plate 3. This changes the magnetic field in the magnetically sensitive element 6, since the resultant field geometry in the air gap 7 is changed. In other words, the entrance of the tongue element 4 into the magnetic circuit F changes the flux density in the magnetically sensitive element 6. This change is analogous to the bending or motion of the tongue element 4, which in turn is analogous to the force exerted on the brake pedal 2. Thus the exerted force is converted directly into an altered magnetic field intensity.

As can be seen from FIG. 2, the tongue element 4 can be moved until it contacts the pedal plate 2 at the stops 12, 13 of the carrier plate 3. When a maximal pedal force is thus exerted, the tongue element 4 is located in the same plane as the carrier plate 3 and thus in the same plane as the magnetic circuit F. The pedal plate 2 is braced against the stops 12, 13 of the carrier plate 3 at this time. When the driver lifts his foot from the brake pedal, the tongue element 4 returns to its outset position, because of its resilient design. In the exemplary embodiment described, the tongue element 4 is made from spring steel. However, it is also conceivable to dispose spring elements or rubber elements on the tongue element 4, which return the tongue element 4 to its outset position.

In FIGS. 3-8, a second exemplary embodiment of a force measuring instrument of the invention is shown. Identical parts are identified by the same reference numerals as in the first exemplary embodiment.

Figure 8:
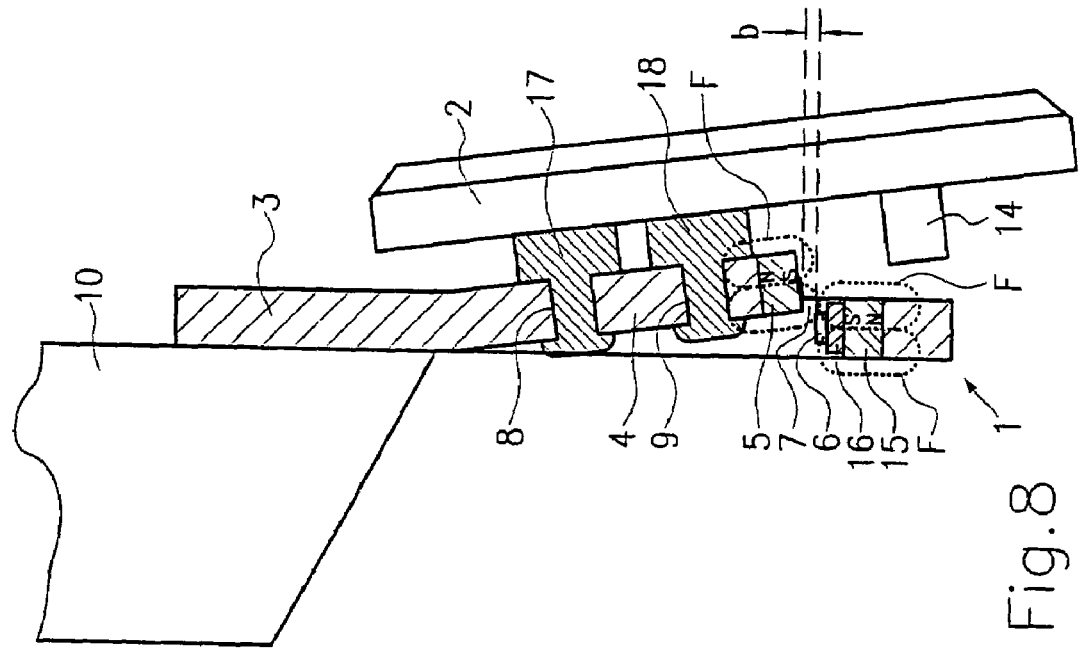
FIG. 8 shows an enlarged view of the side view, shown in FIG. 6, of the force measuring instrument in the second exemplary embodiment.
Figure 7:
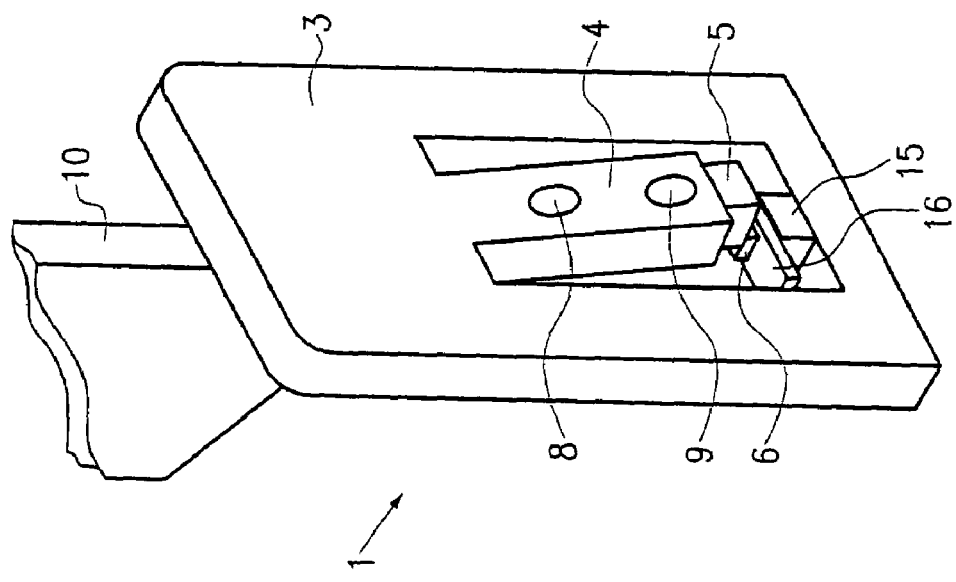
FIG. 7 is an enlarged perspective view of the force measuring instrument shown in FIG. 5, in the second exemplary embodiment of the present invention.

As shown particularly in FIGS. 7 and 8, the force measuring instrument 1 again includes a carrier plate 3, which is solidly joined (see FIGS. 3-6) to a brake pedal lever 10 supported rotatably about a bearing 11. A tongue element 4 is also provided, which is formed integrally with the carrier plate 3. The movable, resiliently embodied tongue element 4 has two through openings 8 and 9, which receive two bolts 17 and 18 for joining the tongue element 4 solidly to a pedal plate 2.

As shown in FIG. 7, the tongue element 4 is embodied in barlike fashion. An air gap 7 is provided on the lower end of the barlike tongue element 4, between the tongue element 4 and the carrier plate 3. As shown in FIG. 8, the air gap 7 has a width b. A first magnet 5 is also disposed on the lower end of the tongue element 4. A second magnet 15 is disposed on the carrier plate 3, in such a way that it protrudes from the carrier plate 3 into the air gap 7. A printed circuit board 16 and a magnetically sensitive element 6 are also disposed on the second magnet 15 (see FIG. 8).

As also shown in FIG. 8, the two magnets 5 and 15 are disposed such that they have opposite polarity. In the sectional view of FIG. 8, the magnetic circuits F of the two magnets 5 and 15 are shown. As a result of this disposition of the two magnets 5 and 15, and because of the polarization of the two magnets 5 and 15 in the same direction, a pronounced field displacement occurs in the air gap 7. A strong measurement effect can be assured as a result. Moreover, because of this, the angle by which the tongue element 4 protrudes from the carrier plate 3 can be selected to be relatively small. This results in a low structural height of the force measuring instrument 1.

The function of the force measuring instrument in the first and second exemplary embodiment is equivalent to that in the first exemplary embodiment. The change, picked up by the magnetically sensitive element, in the magnetic field density is converted into a signal, which is delivered to a brake control device by means of the printed circuit board 16.

As shown in FIG. 8, the force measuring instrument 1 in the second exemplary embodiment additionally has a stop element 14, which is mounted on the pedal plate 2. This stop element 14 acts as a mechanical stop, in order to furnish a high overload capacity. As a result, the driver can even perform panic braking, in which peak forces of over 3000 Newtons can occur, without damaging the force measuring instrument. A high overload capacity of the force measuring instrument is thus assured.

In summary, the present invention thus relates to a force measuring instrument, having a carrier plate 3, at least one magnet 5, and at least one magnetically sensitive element 6. An elastically disposed tongue element 4 protrudes at least partly from the carrier plate 3 and is joined to a plate element 2. Between the tongue element 4 and the carrier plate 3, an air gap 7 is formed, in which the magnetically sensitive element 6 is positioned. The force to be measured, delivered via the plate element 2, leads to a relative motion between the end, toward the air gap, of the tongue element 4 and the carrier plate 3. This causes a change in the magnetic field geometry in the air gap 7. The present invention also relates to a method for detecting a force.

The above description of the exemplary embodiments of the present invention is meant solely for illustrative purposes and not for the sake of limiting the invention. Various changes and modifications are possible within the context of the invention without departing from the scope of the invention or its equivalent.

The invention claimed is:

1. A measuring instrument for detecting a force, including:
   a carrier plate,
   at least one magnet,
   a magnetically sensitive element, and
   a tongue element, which protrudes from the carrier plate,
   wherein the at least one magnet is disposed on the tongue element, on the carrier plate, or on both the tongue element or and carrier plate;
   wherein between the tongue element and the carrier plate, an air gap is formed, in which the magnetically sensitive element is disposed for detecting a force that produces a relative motion between the at least one magnet and magnetically sensitive element, and wherein the force to be detected is applied to the carrier plate or the tongue element.

2. The measuring instrument for detecting a force of of claims 1, wherein the measuring instrument has a first magnet and a second magnet, the first magnet being disposed on the tongue element and the second magnet being disposed on the carrier plate.

3. The measuring instrument for detecting a force of of claims 1, wherein the tongue element is embodied integrally with the carrier plate.

4. The measuring instrument for detecting a force of of claims 1, wherein the tongue element is embodied resiliently.

5. The measuring instrument for detecting a force of of claims 1, wherein the measuring instrument has a stop for limiting the motion of the tongue element.

6. The measuring instrument for detecting a force of claim 5, wherein a separate stop is embodied on a plate element which is joined to the tongue element, or that parts of the carrier plate are embodied as a stop for the plate element joined to the tongue element.

7. The measuring instrument for detecting a force of of claims 1, wherein the tongue element is embodied as a bar.

8. A method for detecting a force, comprising the following steps:
   converting a force delivered via a movable tongue element into a relative motion between the tongue element and a carrier plate, wherein the relative motion between the tongue element and the carrier plate leads to a change in a magnetic field intensity, which is detectable by a magnetically sensitive element disposed in an air gap between the carrier plate and the tongue element wherein the magnet is disposed on the tongue element, or on the carrier plate, or on both the tongue element and the carrier plate, and wherein the force to be detected is applied to the carrier plate or the tongue element.

* * * * *